US009959101B2

(12) United States Patent
Baumgart et al.

(10) Patent No.: US 9,959,101 B2
(45) Date of Patent: May 1, 2018

(54) CONDITIONAL SEQUENTIAL SELECTION OF EXTERNAL REFERENCE SOLUTIONS

(71) Applicant: International Business Machines Corporation, Armonk, NY (US)

(72) Inventors: Leona D. Baumgart, Los Gatos, CA (US); Allan H. Kielstra, Ajax (CA); John R. Ehrman, Sunnyvale, CA (US); Barry L. Lichtenstein, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 13/893,440

(22) Filed: May 14, 2013

(65) Prior Publication Data

US 2013/0311979 A1    Nov. 21, 2013

Related U.S. Application Data

(63) Continuation of application No. 13/471,848, filed on May 15, 2012.

(51) Int. Cl.
G06F 9/45       (2006.01)
G06F 9/445     (2018.01)

(52) U.S. Cl.
CPC . *G06F 8/41* (2013.01); *G06F 8/54* (2013.01)

(58) Field of Classification Search
CPC ....................................................... G06F 9/44
See application file for complete search history.

(56) References Cited

U.S. PATENT DOCUMENTS

| 6,502,187 | B1* | 12/2002 | Miyagawa ..................... 712/225 |
| 6,542,167 | B1* | 4/2003 | Darlet ................. G06F 9/44521 715/762 |
| 6,578,194 | B1 | 6/2003 | Baumgart et al. |
| 6,779,187 | B1 | 8/2004 | Hammond |
| 6,802,060 | B1 | 10/2004 | Shann |
| 7,404,182 | B1 | 7/2008 | Garthwaite et al. |
| 7,721,274 | B1 | 5/2010 | Panchenko et al. |
| 2002/0169900 | A1* | 11/2002 | Hiji ........................ G06F 13/28 710/22 |

(Continued)

OTHER PUBLICATIONS

Compiler Reference—#pragma weak; http://publib.boulder.ibm.com/infocenter/compbgpl/v9v111/topic/com.ibm.xlcpp9.bg.doc/; 3 pages.

(Continued)

*Primary Examiner* — Jae Jeon
(74) *Attorney, Agent, or Firm* — Cantor Colburn LLP (57) ABSTRACT

External references are resolved in a software compiling and linking environment by identifying a group of related external references and by processing the group of external references until a stopping condition is satisfied. The external references are processed by selecting a next external reference from the group of external references as a current external reference and by resolving the current external reference with a matching definition if a matching definition for the current external reference exists. The stopping condition is designated as being satisfied if either the selected external reference is resolved, or if each external reference in the group of external references has been selected.

17 Claims, 6 Drawing Sheets

(56) References Cited

U.S. PATENT DOCUMENTS

2002/0170041 A1* 11/2002 Shann .......................... 717/141
2007/0169026 A1   7/2007 Davis
2010/0091858 A1* 4/2010 Yang ....................... 375/240.13
2012/0328015 A1* 12/2012 Kim et al. ............... 375/240.13

OTHER PUBLICATIONS

Louis A. Angelucci; First Office Action; U.S. Appl. No. 13/471,848(IBM 087 PA); dated Dec. 4, 2013; United States Patent and Trademark Office.
Louis A. Angelucci; Final Office Action; U.S. Appl. No. 13/471,848(IBM 087 PA); dated Jun. 27, 2014; United States Patent and Trademark Office.
Sergio Jose Curbelo III; Non-Final Office Action; U.S. Appl. No. 13/471,848(IBM 087 PA); dated Apr. 13, 2015; United States Patent and Trademark Office.

* cited by examiner

CONDITIONAL SEQUENTIAL SELECTION OF EXTERNAL REFERENCE SOLUTIONS

RELATED APPLICATIONS

This application claims the benefit, and is a continuation application, of application No. U.S. Ser. No. 13/471,848, filed May 15, 2012, entitled CONDITIONAL SEQUENTIAL SELECTION OF EXTERNAL REFERENCE RESOLUTIONS, by Baumgart et al., the disclosure of which is incorporated herein by reference.

BACKGROUND

Various aspects of the present invention relate generally to the linking of object code in a software compiling environment, and specifically to providing alternative resolutions for external symbol references.

In many computer programming environments, a source program component (e.g., a main program, a subroutine, a function, etc.) written in a programming language is translated to create an object module (i.e., object code), which will later be converted by a linker into an executable program. However, in certain cases, the object module cannot be converted directly to an executable program because additional components are needed to provide data conversion, input and output services, and other necessary actions. Thus, the object module will typically contain external references to the names of the required additional components. The object module may also contain external symbol definitions that correspond to external references in other object modules.

When converting an object module to an executable application, the linker attempts to resolve external references, usually by matching the name of the external reference to the name of an external symbol definition. Typically, the linker will search primary object modules for definitions to resolve the external references, and if no definition exists in the primary modules, the linker will search collections of modules, such as libraries or archives, for the definition.

If no references remain unresolved, the resolution process is complete and the resulting executable program is saved for later execution. Alternatively, the executable program is loaded into memory for immediate execution. However, if some references remain unresolved, then those references may be able to be resolved at run-time or the linker may issue an error and not create the executable program.

BRIEF SUMMARY

According to aspects of the present invention, external references are resolved in a software compiling environment. The resolution of external references comprises identifying a group of external references. The group of external references may comprise, for instance, a sequence or other logical grouping of related, alternative references, where only one reference of the group need be selected or otherwise resolved in order to satisfy a link, for instance, to a called program. The resolution of external references further comprises performing, e.g., by a processor, until a stopping condition is satisfied, the operations of selecting a next external reference from the group of external references as a current external reference and resolving the current external reference with a matching definition if a matching definition for the current external reference exists. The resolution of external references further comprises designating the stopping condition as satisfied if the selected external reference is resolved and designating the stopping condition as satisfied if an attempt has been made to select each external reference in the group of external references.

According to still further aspects of the present invention, a method for creating an application comprises translating, using a processor, source code into object code by organizing external references in the source code as a group of related, alternative external references and linking, using the processor, the object code by resolving the external references. Linking is attempted by sequentially stepping through each external reference of the group and resolving a selected external reference with a matching definition if a matching definition for the unresolved external reference exists, wherein the sequential process continues until either the selected external reference from the group is resolved, or an attempt has been made to resolve all external references in the group. The method still further comprises creating, using the processor, an executable file based on the linked object code.

DETAILED DESCRIPTION

In the following detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

Aspects of the present invention described more fully herein, provide alternative resolutions for external references. In an illustrative implementation, program code is utilized to enable a linker to resolve a single external reference from a sequence of related, alternative external references (i.e., a group of external references). A calling program declares a sequence of external references, referred to herein as a group of external references. The declared sequence of external references may be arranged, for instance, in a preferred order of resolution. Only one external reference in the group needs to be resolved before the linker moves on to another group of external references.

During the linking of object code, a linker resolves external references with external symbol definitions to convert the object code into an executable program (e.g., an .exe file). The external symbol definitions may be located for instance, in other object code being linked, or the external symbol definitions may reside in a library accessible by the linker. When the linker attempts to resolve a group of (related declared) external references, the linker starts with the first member of the group and attempts to resolve that external reference first. If the first external reference in the group is resolved, the remaining group members are not considered for resolution. If the first external reference is not resolved, an attempt is made to resolve the second external reference of the group and so forth, until either one of the external references in the group has been resolved, or no external reference of the group is resolved.

This process is referred to herein as "conditional sequential selection" of external reference resolutions because some references are not required to be resolved, and alternative resolutions are attempted in a specified sequence until a satisfactory resolution is achieved. In typical programming environments, a translator will generate the needed conditional sequential references, and the user of the translator need not be aware of the processes used to create the groups of external references (e.g., related symbol references).

In an illustrative implementation, the linker sequentially steps through members (i.e., individual external references) of the group of external references looking for a matching external symbol definition to resolve the member. No error needs to be reported, unless the entire group is exhausted without successfully selecting a resolved symbol, in which case the linker may take an appropriate action, e.g., indicate an error condition. Thus, a group of external references is left unresolved only if all of the members of the group are unresolved. However, once one member of the group is resolved, the linker moves on, e.g., to a next group of external references.

A particular external reference may be a member of more than one group of external references, where each group can be a different size (including a group of 1). Because of this, a particular external reference can be identified in an error condition even if that particular external reference is in a group of external references where, as a group, the resolution was successful. In this regard, the particular external reference need not occupy the same position within multiple groups of external references, e.g., the particular external reference need not be positioned always first, always last, etc. Thus, the position of a particular external reference in a first group of external references may be selected independently of the position selected for the particular reference in a second group of external references.

For instance, assume there are two groups (A) and (B), each with an external reference to symbol (X). There may be an error condition in group (A), whereas there might not be an error condition in group (B). As an example, it might be that in group (A), no symbols in the group could be resolved, whereas in group (B) some other symbol besides (X) was resolved.

Sequence Flag:

In an illustrative example, a "sequence flag" is used to designate membership in a group of external references. In an exemplary implementation, each member of a group of external references except the last member is marked with a sequence flag indicating that the next reference is a member of the same group. The sequence flag indicates to the linker that if a given member of the group of external references cannot be resolved, it should attempt resolution of the next member of the sequence. Because the last member of the group is not marked with the sequence flag, no further resolution attempts are made if the last reference is unresolved. If only a single reference is intended, its sequence flag is set off.

In another illustrative example, the members in a group of external references include a sequence flag that indicates whether the member is the last member in the group or not. For example, a set flag may indicate that a member is the last member in the group, and a reset flag may indicate that the member is not the last member in the group. Alternatively, a reset flag may indicate that a member is the last member in the group, and a set flag may indicate that the member is not the last member in the group. As yet another example, the flag may only be present on a member that is the last member in corresponding group of external references. Of course, other alternative implementations may be used so long as the group members can be identified.

According to aspects of the present invention, the sequence flag is implemented by updating a relocation directory item to include a sequence flag. A relocation directory contains information about fields within the generated machine language data that can be updated by the linker to satisfy external references to external symbol definitions defined in other modules. Typically, these fields will be updated by the linker to contain addresses or values of other components referenced by the source program (referred to as address constants). Thus, the relocation directory item includes not only position information, and relocation information, but also other data including the sequence flag. Under this arrangement, the linker is also enhanced to recognize the sequence flag, and take alternative actions depending on its setting, examples of which are set out in greater detail herein. An alternative implementation can comprise, for example, chaining together the relocation directory entries to indicate membership. In this exemplary implementation, a null forward chain pointer can be used to indicate the last entry.

Moreover, as an example, the processing of groups herein may be implemented in environments where there is no external symbol dictionary, but rather, only the relocation directory, e.g., by including external symbols in the relocation directory. Alternatively, the processing of groups may be implemented in environments with a relocation directory, one or more external symbol dictionaries, or combinations of the thereof.

Group Definition:

In an illustrative but non-limiting example, a programmer declares a group of (related) external references by using statements that have been extended to accommodate the group. For example, when using the IBM High Level Assembler, the programmer can explicitly declare a group of external references as:

DC V(symbol[:symbol:symbol] . . . , symbol . . . )

Thus, in the example:

DC V(A:B:C, D, E)

Here, the first group of external references includes a sequence of A, B, and C, where C is the last member of the group. Both D and E are groups of one member each, so both D and E are the last members of their respective groups. As the example illustrates, groups of external references may have any number of members including one. The choice of a colon (i.e., ":") to designate a group member is an arbitrary character to delineate between members of a group and was only selected for clarity of discussion herein. As such, in practice any character may be used to associate group members.

The symbols D and E can logically be thought of as not being members of a group of external references, or alternatively, D and E can each be considered a single member group. Keeping with the above example, a single member group may not have a sequence flag. Alternatively, the references for symbols D and E may have a sequence flag that is not set. Other implementations are possible for distinguishing the last member in a group from other members of that group.

In an illustrative implementation, when the program code is translated, the translator generates a single address field for all the members of the same group of external references. Thus, keeping with the above example, a first address field is generated for group A:B:C; a second address field is generated for D and a third address field is generated for E. If a resolution by the linker is successful, each address field will contain the resolved address or value of the resolved external reference.

Figure 1:
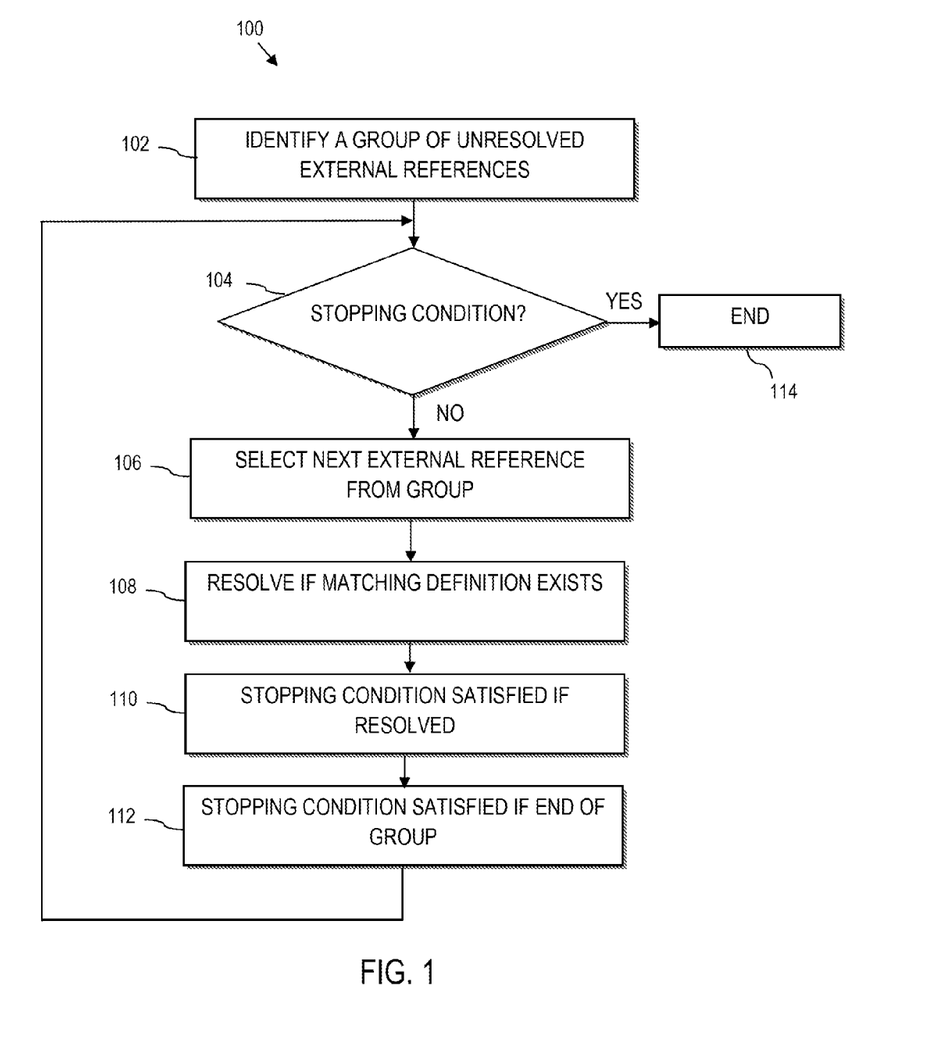
FIG. 1 is a flow chart illustrating a process for resolving external references according to various aspects of the present invention.

Selecting External References Using Groups:

Referring now to the drawings, and in particular, to FIG. 1, a process 100 for resolving external references in a software compiling environment is provided. The process 100 may be implemented, for instance, as computer code executed by a processor of an electronic device. Further, the process 100 may be implemented as computer code stored on a tangible, non-transitory computer-readable storage medium such as a computer readable storage device, such that when the code is read out and executed by a processor, the electronic device implements the process 100. For instance, the computer-readable storage medium may include code that implements a linker that is capable of implementing the method of FIG. 1.

The process comprises identifying a group of external references at 102. The group of external references may comprise, for instance, a sequence or other logical grouping of related, alternative references, where only one reference of the group of external references need be resolved in order to satisfy a link, for instance, to a called program, as described more fully herein.

The process further comprises checking for a predetermined stopping condition at 104. If the stopping condition is not satisfied, the process comprises performing, by a processor, the operations of selecting a next external reference from the group of external references as a current external reference at 106 and resolving the current external reference with a matching definition if a matching definition for the current external reference exists at 108. The process further comprises designating the stopping condition as satisfied if the selected external reference is resolved at 110 and designating the stopping condition as satisfied if an attempt has been made to resolve each external reference in the group of external references at 112. The method then loops back to 104.

In an exemplary but illustrative implementation of the present invention, each unresolved external reference in the group of external references includes a sequence flag that indicates whether or not the unresolved external reference is a last unresolved external reference within the group of external references. In this regard, the method 100 performs the loop 104, 106, 108, 110, 112 until an external reference of the group is resolved, or the sequence flag of a selected unresolved reference indicates that the selected unresolved external reference is the last reference and an attempt has been made to resolve each external reference of the group.

Figure 2:
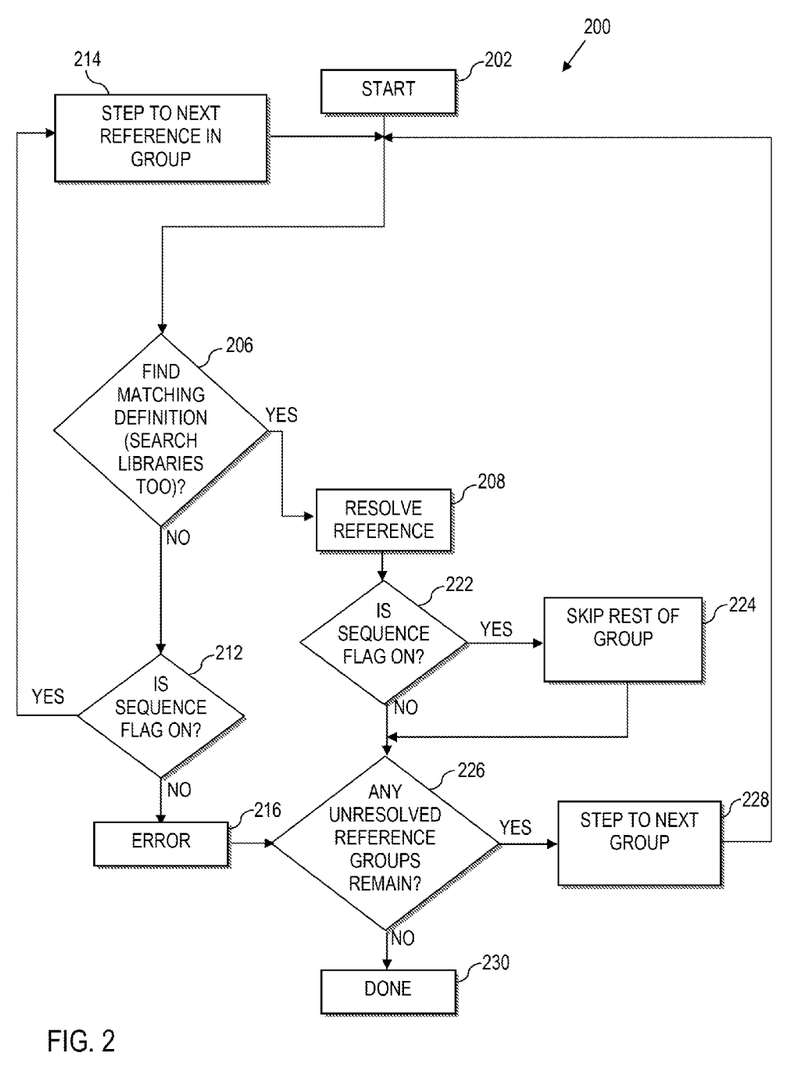
FIG. 2 is a flow chart illustrating a process for resolving external references in a software compiling and linking environment, according to various aspects of the present invention.
Figure 3:
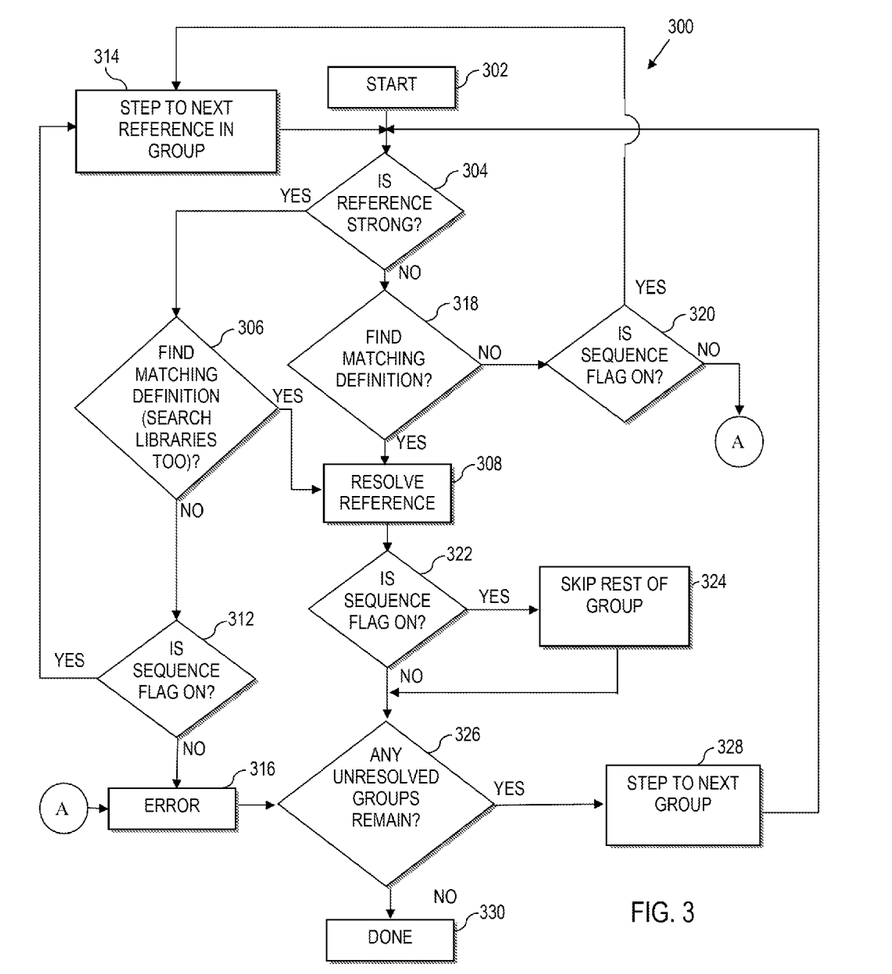
FIG. 3 is a flow chart illustrating a process for resolving external references in a software compiling and linking environment, where the external references can be strong or weak and definitions are all strong, according to various aspects of the present invention.
Figure 4:
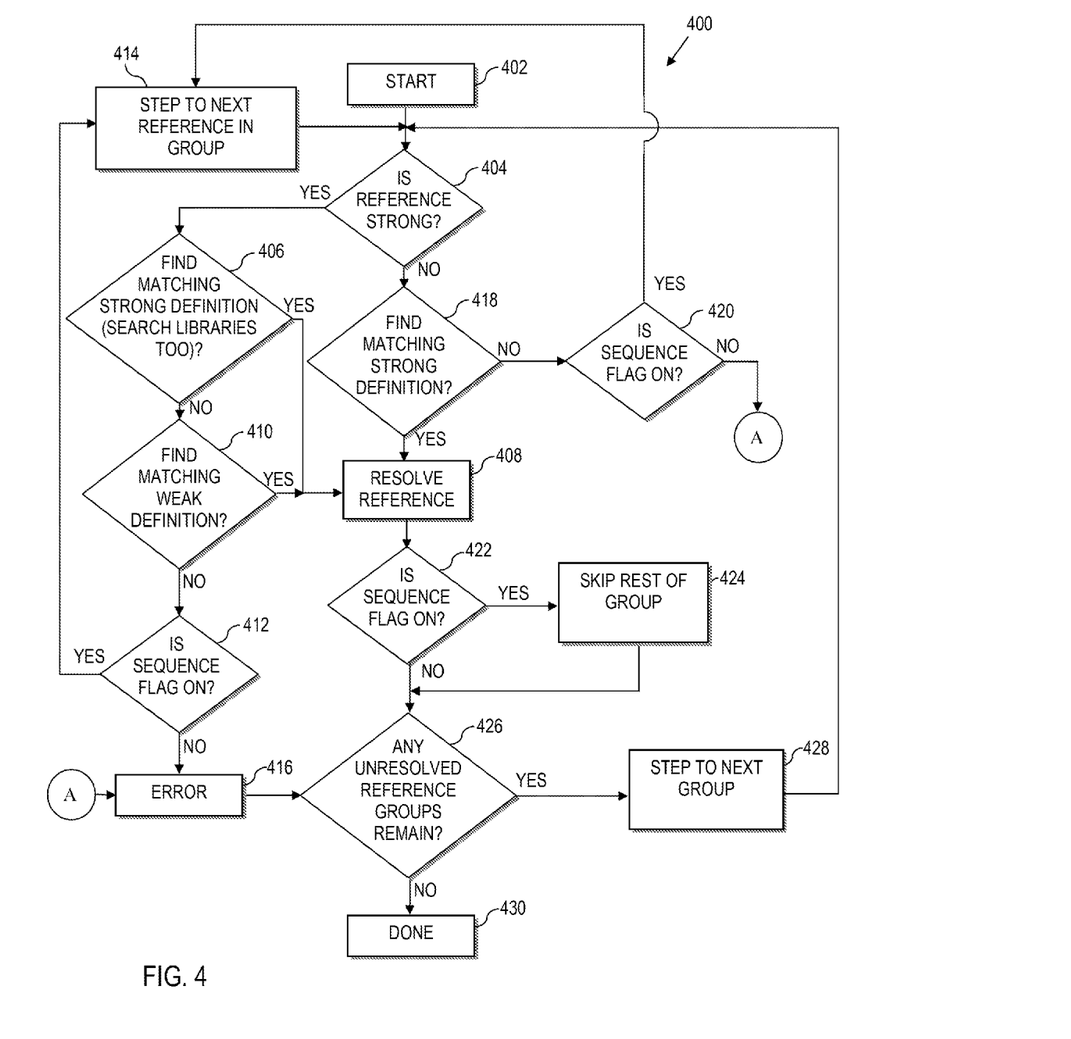
FIG. 4 is a flow chart illustrating a process for resolving external references in a software compiling and linking environment, where the external references and definitions can be strong or weak, according to various aspects of the present invention.

FIGS. 2-4 illustrate processes 200, 300, 400 for resolving external references once the program code has been translated into object code, which expand upon the method 100 of FIG. 1. Similar numbers in the last two digits in the reference numerals of the blocks in FIGS. 2-4 indicate similar parts of the processes 200, 300, 400.

Selecting External References Using Groups with Sequence Flags:

Referring to FIG. 2, a process 200 for resolving external references is shown according to certain aspects of the present invention. The process 200 may be implemented, for instance, as computer code executed by a processor of an electronic device, e.g., in a manner analogous to that set out in greater detail herein. For instance, a computer-readable storage medium may include code that implements a linker that is capable of implementing the method of FIG. 2.

When starting 202, the process 200 selects a first group of (related) external references and then selects the first reference in the first group. At 206 the process 200 looks for a matching external symbol definition for the selected external reference, and if a matching definition is found, the process proceeds to 208. For instance, in an illustrative implementation, the linker checks whether the there is a matching definition for this reference. In an illustrative implementation, the library search is completely independent of the sequential selection process 200. In an alternative implementation, if no match is found among the external symbol definitions currently available, the linker may search available libraries for a matching external symbol definition.

However, if a matching definition is not found at 206, then at 212 the process 200 checks to see if the unresolved reference is the last reference in the selected group of external references (e.g., checks the sequence flag to determine if it is on in this illustrative example). As an illustrative example, the process 200 can check to see if the sequence flag in the relocation directory item for this reference is on. If the sequence flag is on (in this case indicating that the reference is not the last member of the selected group), then at 214, the process selects the next member of the selected group and proceeds back to 206. If the sequence flag is not on (in this case indicating that the reference is the last member of the selected group), or if there is no sequence flag, then the process issues an error and proceeds to 226. As mentioned above, an error may or may not prevent the linker from creating an executable program file. In some embodiments, an error indication may abort the entire resolution process.

At 208, the process resolves the reference with the found matching definition and proceeds to 222. At 222, the process checks to see if the resolved reference is the last reference in the selected group (e.g., checks the sequence flag to determine if it is on). If the sequence flag is on (in this case indicating that the reference is not the last member of the selected group), then at 224, the process skips the rest of the members in the selected group and proceeds to 226. If the sequence flag is not on (in this case indicating that the reference is the last member of the selected group), then the process proceeds directly to block 226. Thus, if resolved at 208, whether or not the sequence flag indicates that there are remaining references in the selected group, control always passes to 226.

No matter how the process 200 got to 226, the process checks to see if any unresolved groups of external references remain. If any unresolved groups of external references remain, then at 228 the process selects the next group of external references, selects the first member of the selected group, and proceeds back to 206. If no unresolved groups of external references remain, then at 230, the resolution process finishes. The linker then performs whatever other tasks are needed to create the executable program.

In illustrative implementations, the process 200 linker may perform optional additional actions in addition to selecting external references. For instance, resolution of one or more references can cause the linker to potentially reduce the size of the program by not incorporating the external references that follow a selected external reference.

Example:

In an illustrative, non-limiting example of the process of FIG. 2, assume that a programmer declares groups of external references using a line of code:

DC V(A:B:C, D:E:F, G, H).

The translator translates the line of code making four groups of external reference (i.e., expressed as sequences of unresolved references). A first group of external references, designated Sequence 1, has members A, B, and C. A second group of external references, designated Sequence 2, has members D, E, and F. A third group of external references, designated Sequence 3, has one member, G and a fourth group of external references designated Sequence 4 has one member H. In this example, a set sequence flag indicates that the associated reference is not the last member of the corresponding group of external references. Thus, references A, B, D, and E all have their respective sequence flags set, and references C, F, G, and H do not have their respective sequence flags set.

At 202, the process selects Sequence 1 as the group of external references and A as the unresolved reference. At 206, the process searches for a matching definition. Assume that a matching definition is found. As such, the flow proceeds to resolve the reference at 208. The process checks the sequence flag of reference A and determines that the sequence flag is set (indicating that A is not the last member of Sequence 1) at 222. The process skips the rest of the members of Sequence 1 at 224 and proceeds to 226.

At 226, the process determines that more unresolved groups of external references remain, so the process selects Sequence 2 and selects reference D (i.e., member D) from Sequence 2 at 228. At 206, the process searches for a matching definition for reference D. Assume for this example that a matching definition cannot be found for D. Therefore, the process checks the sequence flag for reference D and determines that the sequence flag is set at 212. At 214, the process selects reference E from Sequence 2 and proceeds to 206, where the process searches for a matching definition. Again, assume that the process cannot find a matching definition for the selected reference E of Sequence 2. Therefore, the process checks the sequence flag for reference E and determines that the sequence flag is set at 212.

At 214, the process selects reference F from Sequence 2 and proceeds to 206 where the process searches for a matching definition. Assume that the process cannot find a matching definition for selected reference F at 206. Therefore, the process checks the sequence flag of reference F and determines that the flag is not set (indicating that reference F is the last member of the associated group of external references). The process issues an error at 216 and proceeds to 226. Depending on possible option settings or user preferences, the linker may treat the unresolved external reference as a minor or serious condition, and may issue a message describing the treatment of the external reference.

At 226, the process determines that more unresolved groups of external references remain, so the process selects Sequence 3 and selects reference G from Sequence 3 at 228. At 206, the process searches for a matching definition. Assume for this example, that a matching definition is located for G, thus the process 200 proceeds to resolve the reference at 208. The process 200 checks the sequence flag of reference G, and determines that the sequence flag is not set (indicating that G is the last member of Sequence 3) at 222, and thus the process 200 proceeds to 226.

At 226, the process 200 determines that more unresolved groups of external references remain, so the process selects Sequence 4 and selects reference H from Sequence 4 at 228. At 206, the process searches for a matching definition. Assume for this example, that a matching definition cannot be located for H. Therefore, the process 200 checks the sequence flag of reference H and determines that the flag is not set (indicating that reference H is the last member of the associated group of external references). The process issues an error at 216 and proceeds to 226, where the process 200 determines that no more groups of external references remain. The process 200 thus finishes resolving references at 230.

Below is pseudo code for an exemplary implementation of the process of FIG. 2:

```
DO WHILE (unresolved groups of external references remain)
  DO WHILE (external references within a selected group remain to be resolved)
    IF (there is a matching definition for this reference)
    THEN (resolve it)
      IF (the current reference has a sequence flag)
      THEN (resolution of this group is complete;
        skip the remaining members of the group, if any)
      ENDIF (test for more group members)
    ELSE
      IF (the current unresolved reference has a sequence flag)
      THEN (next member of the group becomes the current reference)
        ITERATE (the DO WHILE for references within a group)
      ELSE (Error: unable to resolve reference)
      ENDIF (tests for any resolution of reference)
    ENDIF
  ENDDO
  IF (unresolved reference groups remain)
  THEN (step to next reference group)
  ENDIF
  ITERATE (the DO WHILE for groups)
ENDDO
```

Turning now to FIGS. 3-4, the process 200 of FIG. 2 can be modified to take into account strong and weak external references and definitions. A strong external reference is preferably resolved to a single strong external symbol definition if a strong external symbol definition exists. Otherwise, the strong reference is resolved to a weak external symbol definition if one exists. If neither a strong nor a weak external symbol definition exists for the strong reference, the linker issues an error.

On the other hand, a weak external reference is normally resolved to a strong external symbol definition, if one exists. However, if no strong definition exists, then the reference is usually left unresolved without an indication of an error (i.e., nothing attempts to resolve a weak reference with a weak definition).

Typically, only a single strong definition for a reference may exist. On the other hand, several weak definitions may exist for a single reference.

Resolving Strong or Weak References with Strong Definitions:

FIG. 3 illustrates a process 300 for resolving external references, where the references may be strong or weak, but all of the definitions are strong, according to certain aspects of the present invention. The process 300 may be implemented, for instance, as computer code executed by a processor of an electronic device, e.g., in a manner analogous to that set out in greater detail herein. For instance, the computer-readable storage medium may include code that implements a linker that is capable of implementing the method of FIG. 3.

When starting at 302, the process 300 selects a first group of external references and then selects the first reference in the first group. At 304, the process 300 determines if the selected reference is a strong reference or a weak reference. If the reference is a strong reference, the flow through continues to 306. Here, the process 300 is similar to the flow through the process 200 of FIG. 2. At 306 the process 300 looks for a matching external symbol definition for the selected strong external reference, and if a matching definition is found, the process proceeds to 308. For instance, if no match is found among the external symbol definitions currently available, the linker may search the available libraries for a matching external symbol definition.

However, if a matching definition is not found at 306, then at 312 the process 300 checks to see if the unresolved reference is the last reference in the group of external references (e.g., checks the sequence flag to determine if it is on in this illustrative example). As an illustrative example, the process 300 can check to see if the sequence flag in the relocation directory item for this reference is on. If the sequence flag is on (in this case indicating that the reference is not the last member of the selected group), then at 314, the process selects the next member of the group and proceeds back to 304. If the sequence flag is not on (in this case indicating that the reference is the last member of the selected group), then the process issues an error at 316 and proceeds to 326. As mentioned above, an error may or may not prevent the linker from creating an executable program file. For instance, depending on possible option settings or user preferences, the linker may treat the unresolved external reference as a minor or serious condition, and may issue a message describing the treatment of the external reference.

If, at 304, the reference is a weak reference, the process looks for a matching external symbol definition for the selected weak external reference at 318, and if a matching definition is found, the process proceeds to 308. In this exemplary implementation, block 306 is intentionally separated from block 318 to illustrate an arrangement where strong references allow library searching but weak references do not allow library searching.

If a matching definition is not found at 318, then at 320 the process 300 checks to see if the unresolved reference is the last reference in the selected group (e.g., checks the sequence flag to determine if it is on). If the sequence flag is on (in this case indicating that the reference is not the last member of the selected group), then at 314, the process selects the next member of the selected group and proceeds back to 304. If the sequence flag is not on (in this case indicating that the reference is the last member of the selected group), then the process proceeds to 316 and then on to 326. For instance, if at least one reference in the group of external references is strong, then an error may be issued at 316 and the flow proceeds to 326 as described more fully herein. As such, the error process at 316 may include logic, e.g., to check whether all references in the group are weak, and if so, not issue an error but instead proceed to 326. Alternatively, any other desired error logic may be implemented.

At 308, the process resolves the reference with the located matching definition and proceeds to 322. At 322, the process checks to see if the resolved reference is the last reference in the selected group (e.g., checks the sequence flag to determine if it is on). If the sequence flag is on (in this case indicating that the reference is not the last member of the selected group), then at 324, the process skips the rest of the members in the selected group and proceeds to 326. If the sequence flag is not on (in this case indicating that the reference is the last member of the selected group), then the process proceeds directly to block 326. Thus, if resolved at 308, whether or not the sequence flag indicates that there are remaining references in the selected group, control always passes to 326.

As described in the example above, if all of the members of the selected group of external references are weak references and no external reference of the selected group could be matched to a definition, then no error needs to be issued. Alternatively, an optional error may be issued. As another illustrative example, the method can keep track of whether any member of the group of external references comprises a strong reference. If there is at least one strong reference member, then an error may be issued if no members are matched to a corresponding definition, regardless of whether the last member of the group of external references (sequence flag on) is strong or weak.

No matter how the process 300 got to 326, the process checks to see if any unresolved groups of external references remain. If any unresolved groups remain, then at 328 the process selects the next group of external references, selects the first member of the newly selected group, and proceeds back to 304. If no unresolved groups of external references remain, then at 330, the resolution process finishes. The linker then performs whatever other tasks are needed to create the executable program.

As mentioned below, the process does not have to be performed in the order of the blocks of the flow chart. For example, in an alternative implementation, blocks 306 and 318 (searching for a definition) can be merged into one block and performed before the process determines whether the reference is a strong or weak reference. If a match is found at the merged block, then the process proceeds to 308. If no match is found, the strength of the reference is determined. If the reference is weak, then the process goes to 320, and if the reference is strong, then the process goes to 312.

As yet another illustrative example, strong" and "weak" can be an attribute of the entire group of external references, rather than an attribute of each individual member of the group of external references. Regardless, the flow of FIG. 3 does not require any changes.

Example:

In an illustrative, non-limiting example of the process of FIG. 3, assume that a programmer declares two groups of external references:

EXTRN A,B,C (strong)
WXTRN D,E,F (weak)
DC V(A:B:C, D:E:F)

In this illustrative example, a first group of external references (A:B:C) contains three strong references and a second group of external references (D:E:F) contains 3 weak references.

The translator translates the third line of code making two groups of external references (i.e., each expressed as a sequence of unresolved references). The first group of external references, designated Sequence 1, has members A, B, and C. The second group of external references, designated Sequence 2, has members D, E, and F. In this illustrative example, the label EXTRN indicates that the members of the group A:B:C are strong and the label WXTRN indicates that the members of the group D:E:F are weak. Moreover, in this example, the presence of a sequence flag indicates that the associated reference is not the last member of the associated group of external references. Thus, references A, B, D, and E all have sequence flags, and references C and F do not have sequence flags. Thus, in this example, all the members of Sequence 1 are strong, while all of the references in Sequence 2 are weak.

At 302, the process selects Sequence 1 as the group of external references and A as the unresolved reference. At 304, the process 300 determines that reference A is strong. At 306, the process searches for a matching definition. Assume in this example, that a matching definition is found for reference A. As such, the process proceeds to resolve the reference at 308. The process checks reference A for the presence of a sequence flag and determines that reference A has a sequence flag (indicating that A is not the last member of Sequence 1) at 322. The process skips the rest of the members of Sequence 1 at 324 and proceeds to 326.

At 326, the process determines that more unresolved groups of external references remain, so the process selects Sequence 2 and selects reference D from Sequence 2 at 328. At 304, the process determines that reference D is a weak reference and proceeds to 318. At 318, the process searches for a matching definition for reference D. Assume for sake of this example that a matching definition cannot be found for reference D. Therefore, the process checks reference D for the presence of a sequence flag and determines that reference D has a sequence flag set at 320. At 314, the process selects reference E from Sequence 2 and proceeds to 304, where the process determines that reference E is a weak reference. At 318, the process searches for a matching definition. Again, assume that the process 300 cannot find a matching definition for the selected member E of Sequence 2. Therefore, the process checks reference E for the presence of a sequence flag and determines that reference E has a sequence flag set at 320.

The process selects the next reference F at 314 from Sequence 2 and proceeds to 304, where the process determines that reference F is a weak reference. The process proceeds to 318 and searches for a matching definition. Assume that a matching definition cannot be found for the reference F at 318. Therefore, the process checks reference F for the presence of a sequence flag, but cannot find one (indicating that reference F is the last member of the group of external references). The process does not issue an error at 316 but proceeds to 326 where it determines that no more groups of external references remain, so the process finishes resolving references at 330.

Pseudo code for the process of FIG. 3 is provided below:

```
DO WHILE (unresolved groups of external references remain)
  DO WHILE (external references within a selected group remain to be
  resolved)
    IF (the current reference is strong)
    THEN
      IF (the current reference has a matching definition)
      THEN (resolve it)
        IF (the current reference has a sequence flag)
        THEN (resolution of this group is complete;
          skip the remaining members of the group, if any)
        ENDIF (Do While for this group done)
      ELSE (no matching definition)
        IF (the current reference has a sequence flag)
        THEN (skip to next member of the group, if any)
          ITERATE (the DO While)
        ELSE (error)
        ENDIF (Do While for this group done)
      ENDIF
```

```
    ELSE (the reference is weak)
      IF (there is a matching definition for this weak reference)
      THEN (resolve weak reference to definition)
        IF (the current reference has a sequence flag)
        THEN (resolution of this group is complete;
          skip the remaining members of the group, if any)
        ENDIF (Do While for this group done)
      ELSE
        IF (the current reference has a sequence flag)
        THEN
          ITERATE (step to next reference, DO WHILE)
        ELSE (DO While for this group done)
          IF (at least one reference of group strong)
          THEN (error)
          ENDIF
        ENDIF
      ENDIF
    ENDIF
  ENDDO
  IF (unresolved reference groups remain)
  THEN (step to next reference group)
  ENDIF
  ITERATE (the DO WHILE for groups)
ENDDO
```

Resolving Strong or Weak References with Strong or Weak Definitions:

FIG. 4 illustrates a process 400 for resolving external references, where the references may be strong or weak and the definitions may be strong or weak also. The process 400 may be implemented, for instance, as computer code executed by a processor of an electronic device, e.g., in a manner analogous to that set out more fully herein. For instance, the computer-readable storage medium may include code that implements a linker that is capable of implementing the method of FIG. 4.

When starting at 402, the process 400 selects a first group of external references and then selects the first reference in the first group. At 404, the process 400 determines if the selected reference is a strong reference or a weak reference. At 406 the process 400 looks for a matching strong external symbol definition for the selected strong external reference, and if a matching strong definition is found, the process proceeds to 408. As noted in greater detail herein, the linker searches for a matching strong definition. If no match is found among the external symbol definitions currently available, the linker may search available libraries for a matching external symbol definition.

However, if a matching strong definition is not found at 406, then the process looks for a matching weak definition at 410. If a matching weak definition is found, then the process proceeds to 408. However, if no matching definition (strong or weak) is found, then the process 400 checks to see if the unresolved strong reference is the last reference in the selected group (e.g., checks the sequence flag to determine if it is on in this illustrative example). If the sequence flag is on (in this case indicating that the reference is not the last member of the selected group), then at 414, the process selects the next member of the selected group and proceeds back to 404. If the sequence flag is not on (in this case indicating that the reference is the last member of the selected group), then the process issues an error at 416 and proceeds to 426. Analogous to embodiments discussed above, an error may or may not prevent the linker from creating an executable program file. For instance, depending on possible option settings or user preferences, the linker may treat the unresolved external reference as a minor or serious condition, and may issue a message describing the treatment of the external reference.

If, at 404, the reference is a weak reference, the process proceeds in a manner that is analogous to the process 300 of FIG. 3 and looks for a matching strong external symbol definition for the selected weak external reference at 418. If a matching strong definition is found, the process proceeds to 408. However, if a matching strong definition is not found at 418, then at 420 the process 400 checks to see if the unresolved weak reference is the last reference in the selected group (e.g., checks the sequence flag to determine if it is on). If the sequence flag is on (in this case indicating that the reference is not the last member of the selected group), then at 414, the process selects the next member of the selected group and proceeds back to 404. If the sequence flag is not on (in this case indicating that the reference is the last member of the selected group), then the process proceeds to 416 and then onto 426.

For instance, if at least one reference in the group of external references is strong (even if that reference is unresolved), then an error may be issued at 416 and the flow proceeds to 426 as described more fully herein. In a manner analogous to 316, the error process at 416 may include logic, e.g., to check whether all references in the group are weak references, and if so, not issue an error but instead proceed to 326.

At 408, the process resolves the (strong or weak) reference with the located matching definition and proceeds to 422. At 422, the process checks to see if the resolved reference is the last reference in the selected group (e.g., checks the sequence flag to determine if it is on). As an illustrative example, the process 400 can check to see whether the sequence flag is on for the current relocation directory item. If the sequence flag is on (in this case indicating that the reference is not the last member of the selected group), then at 424, the process skips the rest of the members in the selected group and proceeds to 426. If the sequence flag is not on (in this case indicating that the reference is the last member of the selected group), then the process proceeds directly to block 426. Thus, if resolved at 408, whether or not the sequence flag indicates that there are remaining references in the selected group, control always passes to 426.

No matter how the process 400 got to 426, the process checks to see if any unresolved groups of external references remain. If any unresolved groups of external references remain, then at 428 the process selects the next group of external references, selects the first member of the newly selected group, and proceeds back to 404. If no unresolved groups of external references remain, then at 430, the resolution process finishes. The linker then performs whatever other tasks are needed to create the executable program. As mentioned herein, the process blocks may be executed in a different order to produce the same result.

Example:

In practice, symbols can be declared weak or strong references. Moreover, a group of external references may comprise a mix of weak and strong references. As a non-limiting but illustrative example, assume that a programmer declares a group of external references:

EXTRN A (strong);
WXTRN B, C (weak);
DC V(B:A:C) (mix).

In this example, the sequence of members of the group of references is weak, strong, weak, thus providing a non-limiting illustration of members of a group having mixed strengths. The translator translates the line of code making one group of external references (i.e., expressed as a sequence of unresolved references). The group of external references, designated as Sequence 1, has members B, A, and C. In this example, a set sequence flag indicates that the associated reference is not the last member of the group. Thus, references B and A both have their respective sequence flags set, and reference C does not have its sequence flag set. Further, only member B of Sequence 1 is strong.

At 402, the process selects Sequence 1 as the group of external references and B as the unresolved reference. At 404, the process 400 determines that reference B is weak. Assume that at 418, the process searches for, but does not find a matching strong definition. At 420, a check determines that the sequence flag for reference B is set, so the process loops back to 414 to set to the next reference in the group. Thus, reference A is now selected. At 404, the process 400 determines that reference A is strong. At 406, the process searches for a matching strong definition. Assume for this example, that the process 400 does not find a matching strong definition for A. As such, the process 400 proceeds to search for a weak definition at 410. Assume that the process finds a weak definition for reference A and resolves reference A at 408. The process checks the sequence flag of reference A and determines that the sequence flag is set (indicating that A is not the last member of Sequence 1) at 422. The process skips the rest of the members of Sequence 1 at 424 (skips reference C) and proceeds to 426. There are no more unresolved groups of external references in this example, so the process ends.

Pseudo code for the process 400 of FIG. 4 is below:

```
DO WHILE (unresolved groups of external references remain)
  DO WHILE (external references within a selected group remain to be
  resolved)
    IF (the current reference is strong)
    THEN
      IF (the current reference has a matching strong definition)
      THEN (resolve it)
        IF (the current reference has a sequence flag)
        THEN (resolution of this group is complete;
          skip the remaining members of the group, if any)
        ENDIF (Do While for this group done)
      ELSE (no matching definition)
        IF (the current reference has a matching weak definition)
        THEN (resolve it)
        IF (the current reference has a sequence flag)
        THEN (resolution of this group is complete;
          skip the remaining members of the group, if
any)
        ENDIF (Do While for this group done)
      ELSE
        IF (the current reference has a sequence flag)
        THEN (skip to next member of the group, if any)
          ITERATE (the DO While)
        ELSE (error)
        ENDIF (Do While for this group done)
      ENDIF
    ENDIF
  ELSE (the reference is weak)
    IF (there is a matching definition for this weak reference)
    THEN (resolve weak reference to definition)
      IF (the current reference has a sequence flag)
      THEN (resolution of this group is complete;
        skip the remaining members of the group, if any)
      ENDIF (Do While for this group done)
    ELSE
      IF (the current reference has a sequence flag)
      THEN
        ITERATE (step to next reference, DO WHILE)
      ELSE (DO While for this group done)
        IF (at least one reference of group strong)
        THEN (error)
        ENDIF
      ENDIF
```

-continued

```
        ENDIF
      ENDIF
    ENDDO
    IF (unresolved reference groups remain)
    THEN (step to next reference group)
    ENDIF
  ITERATE (the DO WHILE for groups)
ENDDO
```

As noted in the discussion above, the linker provides information (the error process at 416) when there is at least one strong reference and none of the symbols are resolved. However, further variations and extensions of the techniques described herein are possible. By way of illustration, and not by way of limitation, in a sequence of unresolved strong external references in a group of external references, one of which was successfully resolved, the linker can provide information about the references in the sequence that were not resolved. As another example, if some strong external references in a group of external references were not resolved, but a weak external reference is successfully resolved, the linker can provide information about the strong references in the sequence that were not resolved. As yet another example, if all strong external references in a group of external references were not resolved and all weak external references in the group were also unresolved, the linker can provide information about some or all of the unresolved weak references.

Still further, the linker can verify that there is no addend information for all relocation directory items in a group of external references, to ensure that a successful resolution is not accidentally modified by an addend belonging to another member of the group. Moreover, the linker can verify that each relocation directory item in a group of external references has identical position and length information for the field to be updated during resolution.

Figure 5:
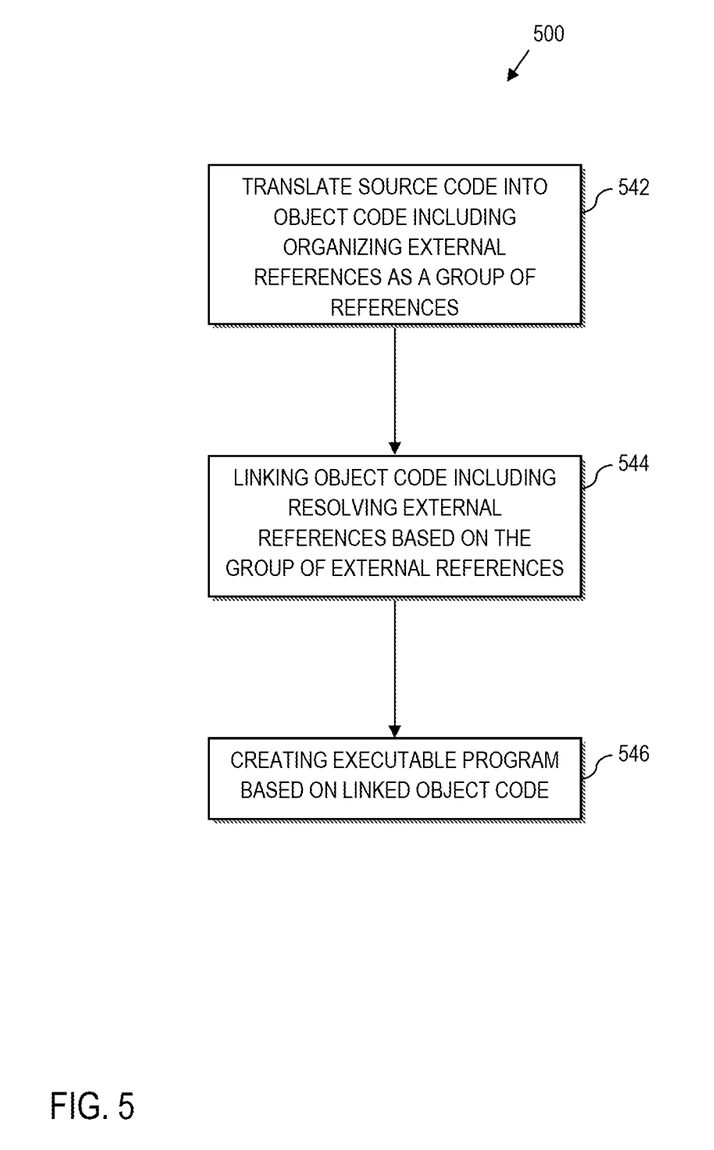
FIG. 5 is a flow chart illustrating a process for creating an executable application from source code, according to various aspects of the present invention.

Process for Creating Executable Code:

Referring now to FIG. 5, a process 500 for creating an executable program is provided. The process 500 may be implemented, for instance, as computer code executed by a processor of an electronic device, e.g., in a manner analogous to that set out in greater detail herein.

At 542, a translator translates source code into object code. As part of the translating process, the translator organizes external references as defined by the translator or by a programmer into groups of external references (e.g., sequences of external references) as defined by the programmer. At 544, a linker links the object code from the translator. As part of the linking process, the linker resolves the external references based on the groups of external references. To do so, the linker may use process 100, 200, 300 or 400 as defined above in FIGS. 1-4 or other variations of those processes as described herein. An executable program is created based on the linked object code at 546.

Translating source code into object code may also comprise assigning a priority to an external reference in the group of external references based at least in part on the other external references in the group of external references. The priority may also be further based on a sequence of the external references in the source code. Assigning a priority to an external reference can further include indicating that an external reference in the group of external references is a last external reference in the group, e.g., using a sequence flag stored in a relocation directory entry associated with the last external reference.

Thus, various aspects of the present invention allow for alternative definitions to be placed into an executable program at linking time as opposed to run time. As an illustrative example, assume that an analysis program may need frequent evaluations of a mathematical function "FUNC," and two possible routines providing that function are available for linking to the main program. One of the routines, designated "NEWFUNC," takes advantage of recent processor instruction enhancements to evaluate the function more rapidly or more accurately whereas the other routine, designated "OLDFUNC." uses only standard non-enhanced instructions to evaluate the function more slowly. Both routines (i.e., NEWFUNC and OLDFUNC) define the weak external symbol definition FUNC, by which the function is referenced by calling programs. If either NEWFUNC or OLDFUNC is resolved, then either will automatically contain the weak definition of FUNC. Typically, the supplier of the mathematical function software will deliver the faster version for use on newer processors supporting the enhanced instructions and the slower version for use on processors without the enhanced instructions.

Thus, the programmer may write an Assembler Language statement like:

FuncAddr DC V(NEWFUNC:OLDFUNC:NOFUNC)

Here, NEWFUNC and OLDFUNC both implement FUNC (which is then called via FuncAddr). Also, the symbols NEWFUNC, OLDFUNC, and NOFUNC are declared as strong external references in the program. "NOFUNC" is a function that allows the program to take appropriate action in case neither of the first two symbols can be successfully resolved.

The translator translates the assembler code to object code at 542 and creates a sequence of external references in the order: NEWFUNC, OLDFUNC, and NOFUNC. Thus, NEWFUNC and OLDFUNC have their respective sequence flags, and NOFUNC does not have a set sequence flag. In the analysis program, the mathematical function corresponding to the strong external reference FUNC needs to be resolved. Both NEWFUNC and OLDFUNC are strong external symbol definitions and NOFUNC is a weak external symbol definition.

The linker will first attempt resolution of the reference to NEWFUNC. If the resolution is unsuccessful the presence of the sequence flag indicates that the linker should next attempt to resolve the reference to OLDFUNC. If the resolution to OLDFUNC is unsuccessful, the presence of the sequence flag indicates that the linker should resolve the reference to NOFUNC so that the analysis program can handle the situation gracefully. If no definitions are present, the linker can issue an error for the unresolved references.

Thus, when the complete program is linked on a system on which both of the function routines is available, the preferred routine (NEWFUNC) will be linked if available. If NEWFUNC is unavailable, the slower routine (OLDFUNC) will be linked.

As an illustrative example, the creator of a program requiring the mathematical function "FUNC," may not know the properties of the processor on which the program will be executed. However, aspects of the present invention allow flexibility in resolving a reference to "FUNC". The approaches described more fully herein can be used to eliminate the need for costly processing overhead, such as to trap error conditions associated with calls that cannot be linked, for instance, to the NEWFUNC. That is, aspects herein eliminate the need for a run-time decision as to whether the program needs to have run-time logic (path length) to choose which function (NEWFUNC or OLD- FUNC) to execute. As such, according to aspects set out more fully herein, the function routine may be smaller (because the function routine need not contain both evaluation paths), and may also be faster (because a decision does not have to be made at each call to take one instruction path or the other).

Moreover, a single address (pointing to the resolved routine's external symbol definition) is generated if one of the members of the group is resolved. Accordingly, a calling program need not make run-time decisions as to which definition to use for a given function because only one routine will be linked with the calling program. As such, the calling program need not retain addresses that reference the external symbol definitions of both routines.

Also, according to aspects of the present invention, both versions of the mathematical function routine may reside in the same linker library, because no strong external symbol definitions are duplicated. If two strong definitions for the same reference are in separate libraries, then the order that the libraries are searched dictates which definition is used. In this regard, a programmer may not know the properties of either the linkers or the processors where a program will eventually be executed. As such, it may be difficult to order the libraries to be searched. However, according to aspects of the current invention, the programmer creates the sequence order of the group of external references in the program code itself and does not need to worry about the order that the libraries are searched because multiple versions of a routine can reside in the same library or in multiple libraries.

Miscellaneous:

Various aspects of the present invention provide generality and compatibility with existing linker technologies, requiring only a single new type of address constant to describe the desired selection sequence for a given reference. Moreover, a single field in the object text is updated. Thus, the same relocation is not attempted for multiple text positions. Still further, according to illustrative aspects herein, an arbitrary number of alternative references is allowed, and arbitrary combinations of weak and strong references are allowed. Yet further, no run-time tests must be made. As such, maximum run-time efficiency is enhanced.

Figure 6:
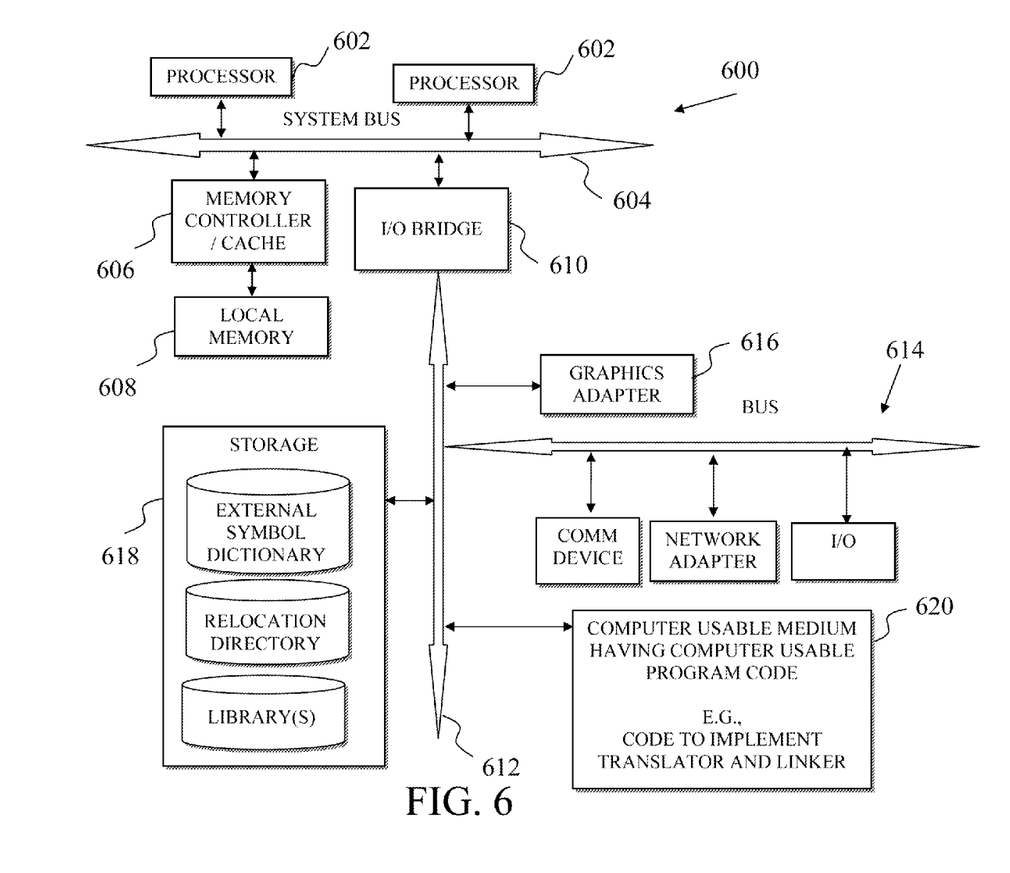
FIG. 6 is a block diagram of a computer system having a computer readable storage medium for implementing functions according to various aspects of the present invention as described in greater detail herein.

Referring to FIG. 6, a block diagram of a data processing system is depicted in accordance with the present invention. Data processing system 600 may comprise a symmetric multiprocessor (SMP) system or other configuration including a plurality of processors 602 connected to system bus 604. Alternatively, a single processor 602 may be employed. Also connected to system bus 604 is memory controller/cache 606, which provides an interface to local memory 608. An I/O bus 612 is connected to the system bus 604 and provides an interface to an I/O bus 614. The I/O bus may be utilized to support one or more buses and corresponding devices, such as bus bridges, input output devices (I/O devices), storage, network adapters, etc. Thus, a network adapter may be coupled to the system to enable the data processing system to become coupled to other data processing systems or remote printers or storage devices through intervening private or public networks.

Also connected to the I/O bus 612 may be devices such as a graphics adapter 616, storage 618 and a computer usable storage medium 620 having computer usable program code embodied thereon. The computer usable program code may be executed, e.g., by the processor(s) to implement any aspect of the present invention, for example, to implement any aspect of any of the methods, processes and/or system components illustrated in FIGS. 1-5. For instance, the computer usable program code can be utilized to implement a linker that implements any one or more of the methods of FIGS. 1-4, the translator and/or linker that implements the method of FIG. 5, etc. Moreover, the computer usable program code may be implemented in the local memory 608 or other suitable storage medium.

The storage 618 may store resources useful in implementing the features described more fully herein. For instance, the storage 618 can store an External Symbol Dictionary, which contains names (external references) of components that are required by the translated program, and names of positions within the object module (external symbol definitions) that can be referenced by other components.

The storage 618 can also store a relocation directory, which contains information about fields within the generated machine language data that can be updated by the linker to satisfy external references to external symbol definitions defined in other modules, as described more fully herein. Typically, these fields will be updated by the linker to contain addresses or values of other components referenced by the source program. The storage 618 can also store other information such as libraries used for matching definitions to references, as described more fully herein. Still further, the storage can store any other useful information, such as data that stores the time and date the object module was created, and an identification of the translator.

The data processing system depicted in FIG. 6 may comprise, for example, an IBM RS/6000 system, a product of International Business Machines Corporation in Armonk, N.Y., running the Advanced Interactive Executive (AIX) operating system, an IBM zSeries processor running the z/OS operating system or other suitable system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), Flash memory, a read-only memory (ROM), an erasable programmable read-only memory (EPROM), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for selecting external references in a software compiling environment, comprising:
   identifying a group of external references where the group defines related alternative external references; and
   performing, by a processor until a stopping condition is satisfied:
      selecting a next external reference from the group of external references as a current external reference;
      resolving the current external reference with a matching definition if a matching definition for the current external reference exists;
      skipping other external references within the group of external references if a matching definition for the current external reference exists and the selected external reference is not the last external reference in the group of external references to be selected;
      designating the stopping condition as satisfied if the selected external reference is resolved; and
      designating the stopping condition as satisfied if an attempt has been made to resolve each external reference in the group of external references.

2. The method of claim 1, wherein:
performing further comprises determining whether or not the selected unresolved external reference is a strong reference; and
resolving the current external reference further comprises resolving the current external reference with the matching definition if a matching strong definition for the unresolved external reference exists.

3. The method of claim 2 further comprises:
issuing an error if:
the current unresolved external reference is the last external reference in the group of external references;
there is at least one strong reference in the group of external references; and
a matching definition was not located for any external reference within the group of external references.

4. The method of claim 1, wherein:
performing further comprises determining whether or not the selected unresolved external reference is a strong reference; and
resolving the current external reference further comprises:
resolving the current external reference with the matching definition if the current reference is a strong reference and a matching strong definition for the unresolved external reference exists; and
resolving the current external reference with the matching definition if the matching definition is strong and if:
the current reference is not a strong reference, and
the matching strong definition for the unresolved external reference exists independently of a library.

5. The method of claim 4, wherein:
resolving the current external reference further comprises:
resolving the current external reference with the matching definition if:
the current reference is a strong reference; and
a matching weak definition for the unresolved external reference exists independently of the library.

6. The method of claim 1, wherein:
the method further comprises selecting a group of at least one external reference from a plurality of groups of external references;
selecting an unresolved external reference from the group of external references comprises selecting an unresolved external reference from the selected group of external references; and
the method further comprises selecting a next group of external references from the plurality of groups of external references if select one of: the selected unresolved external reference is the last reference in the selected group of external references, and the selected unresolved external reference is resolved.

7. The method of claim 1, further comprising providing each unresolved external reference in the group of external references with a sequence flag that indicates whether or not the unresolved external reference is a last unresolved external reference within the group of external references.

8. The method of claim 7, wherein the last unresolved reference in the group of external references is indicated by its sequence flag set off and each other unresolved reference in the group of external references is indicated by its sequence flag set on.

9. The method of claim 7, wherein the last unresolved reference in the group of external references is indicated by its sequence flag set on and each other unresolved reference in the group of external references is indicated by its sequence flag set off.

10. The method of claim 9, wherein performing further comprises:
skipping the other unresolved external references within the group of external references if a matching definition for the unresolved external reference exists and if the sequence flag for the selected external reference indicates that the selected external reference is not the last external reference in the group of external references.

11. The method of claim 7, wherein the sequence flag associated with a given unresolved reference is stored in a relocation directory entry corresponding to the given unresolved reference.

12. The method of claim 7, wherein:
performing, by a processor until a stopping condition is satisfied comprises performing, by a processor, until a select one of: the sequence flag of a selected unresolved reference indicates that the selected unresolved external reference is the last reference, and the selected unresolved external reference is resolved.

13. A method for creating an application, the method comprising:
translating, using a processor, source code into object code by organizing external references in the source code as at least one group of external references;
linking, using the processor, the object code by attempting to resolve the external references by:
sequentially stepping through each external reference of the group and resolving a selected external reference with a matching definition if a matching definition for the unresolved external reference exists, wherein the sequential process continues until either the selected external reference from the group is resolved, or an attempt has been made to resolve all external references in the group; and
skipping other external references within the group of external references if a matching definition for the current external reference exists and the selected external reference is not the last external reference in the group of external references to be selected; and
creating, using the processor, an executable file based on the linked object code.

14. The method of claim 13, wherein translating source code into object code further includes: assigning a priority to an external reference in the group of external references based at least in part on the other external references in the group of external references.

15. The method of claim 14, wherein the priority is further based on a sequence of the external references in the source code.

16. The method of claim 15, wherein assigning a priority to an external reference further includes indicating that an external reference in the at least one group of external references is a last external reference in the group.

17. The method of claim 16, wherein indicating that an external reference in the at least one group of external references is a last external reference in the group includes indicating that the external reference is the last external reference in the group with a sequence flag stored in a relocation directory entry associated with the last external reference.

* * * * *